(12) United States Patent
Odate

(10) Patent No.: US 8,844,667 B2
(45) Date of Patent: Sep. 30, 2014

(54) SEAT BELT APPARATUS

(71) Applicant: Honda Motor Co., Ltd., Tokyo (JP)

(72) Inventor: Shotaro Odate, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/049,599

(22) Filed: Oct. 9, 2013

(65) Prior Publication Data

US 2014/0103696 A1 Apr. 17, 2014

(30) Foreign Application Priority Data

Oct. 16, 2012 (JP) .................................. 2012-228894

(51) Int. Cl.
*B60R 22/48* (2006.01)

(52) U.S. Cl.
CPC ..................................... *B60R 22/48* (2013.01)
USPC ............ 180/268; 180/270; 297/481; 280/807

(58) Field of Classification Search
USPC ........ 180/268, 270; 280/801.1, 807; 297/474, 297/481
See application file for complete search history.

(56) References Cited

U.S. PATENT DOCUMENTS

| | | | | |
|---|---|---|---|---|
| 5,123,673 | A * | 6/1992 | Tame | 280/801.1 |
| 5,520,263 | A * | 5/1996 | Suran et al. | 180/270 |
| 6,485,058 | B1 * | 11/2002 | Kohlndorfer et al. | 280/808 |
| 6,669,234 | B2 * | 12/2003 | Kohlndorfer et al. | 280/801.1 |
| 6,676,162 | B2 * | 1/2004 | Wiberg et al. | 280/808 |
| 7,407,193 | B2 * | 8/2008 | Yamaguchi et al. | 280/805 |
| 2003/0075914 | A1 * | 4/2003 | Kohlndorfer et al. | 280/808 |
| 2003/0201635 | A1 * | 10/2003 | Gyllenspetz et al. | 280/801.1 |
| 2006/0181073 | A1 * | 8/2006 | Sugiyama et al. | 280/801.1 |
| 2006/0289219 | A1 * | 12/2006 | Tanaka | 180/268 |
| 2007/0084955 | A1 * | 4/2007 | Tanaka et al. | 242/374 |

(Continued)

FOREIGN PATENT DOCUMENTS

| | | |
|---|---|---|
| DE | 102007062590 B3 | 5/2009 |
| EP | 2 578 456 A1 | 4/2013 |

(Continued)

OTHER PUBLICATIONS

Machine translation of WO2011/152144 and corresponding EP2578456.*

(Continued)

*Primary Examiner* — Paul N Dickson
*Assistant Examiner* — Barry Gooden, Jr.
(74) *Attorney, Agent, or Firm* — Rankin, Hill & Clark LLP

(57) ABSTRACT

A control device controls driving of a motor such that a clutch of a power transmission mechanism is moved to a disconnecting position and thereby a belt reacher device is moved around in a forward direction of a vehicle by a return spring of the belt reacher device, if a change from an open state to a closed state of a door is detected by a door switch. The control device controls driving of the motor such that a webbing is winded and thereby the belt reacher device is moved around to a retracted position in a backward direction of the vehicle, if a determination is made that no occupant seated in a passenger seat is detected by an output of an OFF signal from a buckle switch of the passenger seat and a determination is made that start-up of the vehicle is detected by an output of an ON signal from an ignition switch.

5 Claims, 8 Drawing Sheets

(56) References Cited

U.S. PATENT DOCUMENTS

| | | | |
|---|---|---|---|
| 2008/0191458 A1* | 8/2008 | Midorikawa | 280/807 |
| 2008/0238076 A1* | 10/2008 | Takao et al. | 280/807 |
| 2010/0243363 A1* | 9/2010 | Tanaka | 180/268 |
| 2011/0001310 A1 | 1/2011 | Fruehauf et al. | |

FOREIGN PATENT DOCUMENTS

| | | |
|---|---|---|
| JP | 59-145646 | 8/1984 |
| JP | 02-125869 U | 10/1990 |
| JP | 04-103451 | 4/1992 |
| JP | 2011-178313 | 9/2011 |
| WO | 2011/152144 | 12/2011 |

OTHER PUBLICATIONS

German Search Report and English translation, Application No. 102013220328.4, dated Mar. 17, 2014, 10 pages.

German Office Action and English translation, Application No. 102013220328.4, dated Mar. 17, 2014, 8 pages.

Japanese Notice of Allowance with English translation, Application No. 2012-228894, dated Jun. 17, 2014, 6 pages.

* cited by examiner

FIG. 4A
FIG. 4B
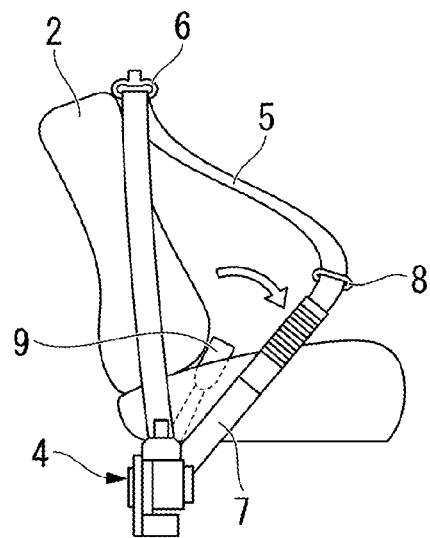
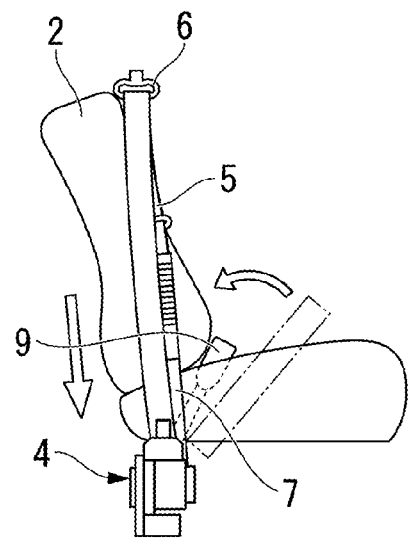
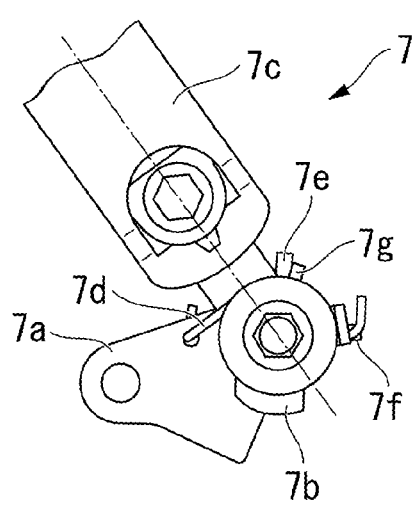
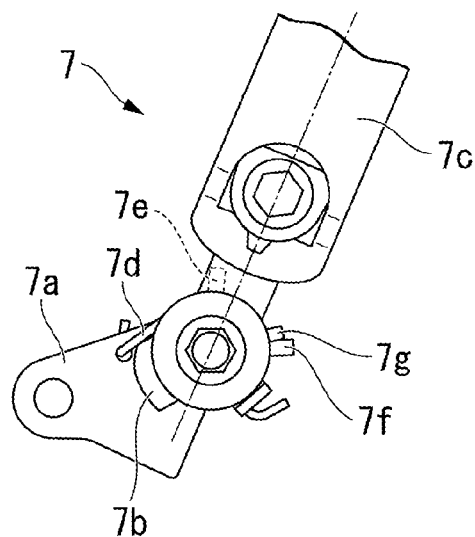

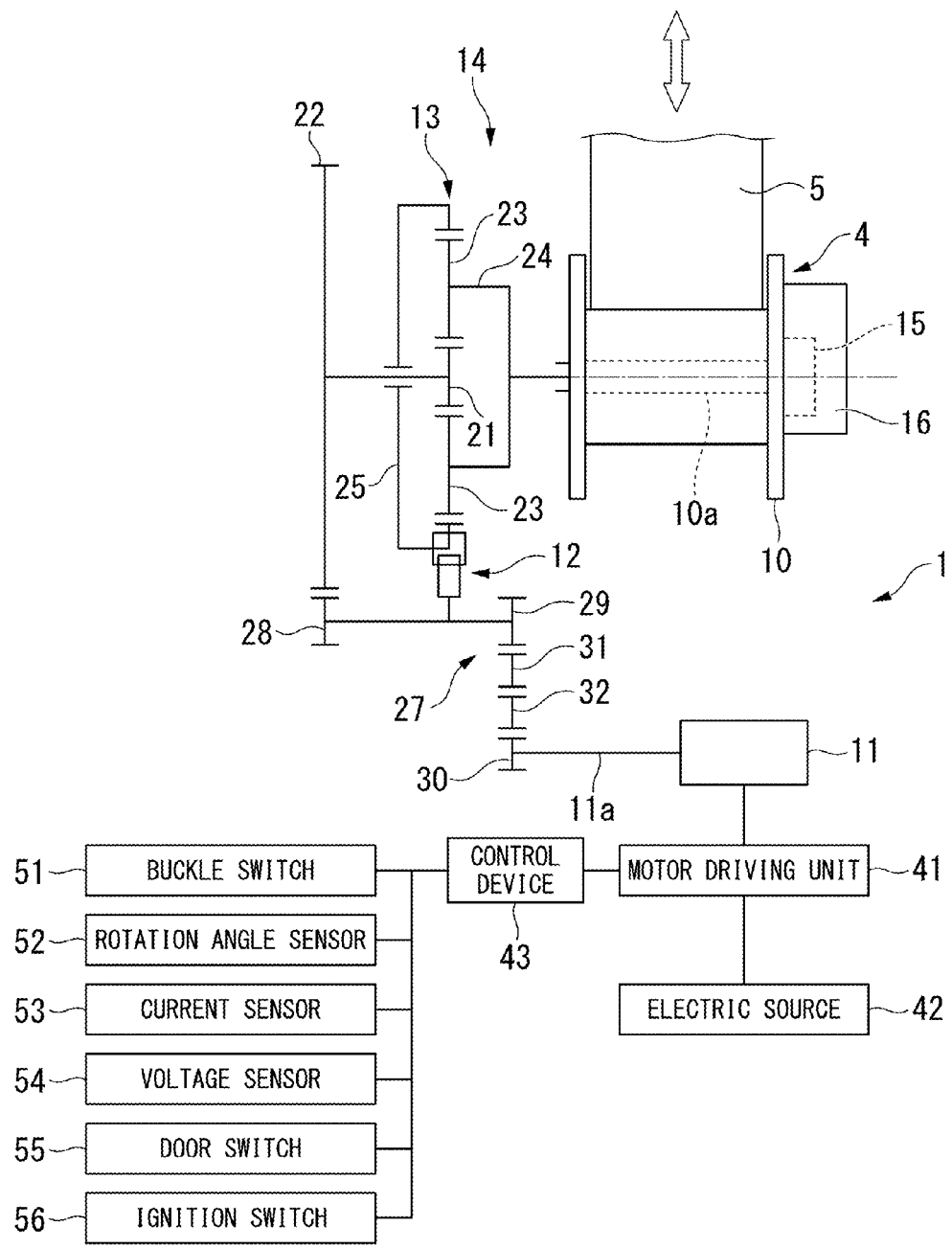

SEAT BELT APPARATUS

CROSS-REFERENCE TO RELATED APPLICATION

Priority is claimed on Japanese Patent Application No. 2012-228894, filed Oct. 16, 2012, the contents of which are incorporated herein by reference.

BACKGROUND

1. Field of the Invention

The present invention relates to a seat belt apparatus.

2. Background

In the past, for example, a seat belt apparatus is known that moves a reacher device (seat belt reacher mechanism) around in a forward direction of a vehicle when an occupant is seated in a seat of a vehicle, and that retracts the reacher device when a buckle switch is OFF in a state where a door of the vehicle is closed and the speed of the vehicle is equal to or greater than a predetermined vehicle speed (for example, refer to PCT International Publication WO 2011/152144).

SUMMARY

In the seat belt apparatus according to the related art described above, because it is necessary to monitor a result of detection of a vehicle speed using a vehicle speed sensor when moving a reacher device around to a retracted position, it is difficult to reduce a processing load, and therefore a problem arises in that it is difficult to downsize the apparatus and to reduce the expense incurred in configuring the apparatus.

In addition, since the reacher device is not retracted before a vehicle speed becomes equal to or greater than a predetermined vehicle speed, a problem arises in that a reacher device hits a door or the like to make an impact sound when lateral acceleration, vibration, and the like act on a vehicle body at the time of running of the vehicle, which gives an uncomfortable feeling to an occupant.

In view of the foregoing, an aspect of the present invention has an object to provide a seat belt apparatus that is capable of reducing a processing load adequately without giving an uncomfortable feeling to an occupant.

In the seat belt apparatus according to an aspect of the present invention, the following configurations are employed in order to achieve the aforementioned object.

(1) A seat belt apparatus according to an aspect of the present invention includes: a webbing reel that winds a webbing to hold an occupant of a vehicle; a motor that is connected to the webbing reel via a transmission mechanism; a clutch member that is movable to a connecting position at which the motor and the webbing reel are maintained in a connecting state, and that is movable to a disconnecting position at which the motor and the webbing reel are maintained in a disconnecting state; a belt reacher device that is arranged to be movable in a forward and backward direction of the vehicle around an axis in an outward direction with respect to a vehicle compartment from a seat, moves around in a forward direction of the vehicle by a biasing member, and moves around to a retracted position in a backward direction of the vehicle by winding of the webbing; a seating detection unit that detects whether or not an occupant is seated in a passenger seat; a start-up state-detection unit that detects a start-up state of the vehicle; a door opening/closing-detection unit that detects opening and closing of a door of the vehicle; and a control unit that controls the motor, wherein the control unit controls driving of the motor such that the clutch member is moved to the disconnecting position and thereby the belt reacher device is moved around in a forward direction of the vehicle by the biasing member, if the door opening/closing-detection unit detects a change from an open state to a closed state of the door, and wherein the control unit controls driving of the motor such that the webbing is winded and thereby the belt reacher device is moved around to the retracted position in a backward direction of the vehicle, if the seating detection unit detects no occupant seated in the passenger seat and the start-up state-detection unit detects start-up of the vehicle.

(2) In the above-described aspect (1), the seating detection unit may be a buckle switch that detects whether or not a tongue of the webbing is attached to a buckle in the passenger seat.

(3) In the above-described aspect (1) or (2), the control unit may control driving of the motor such that the webbing is winded and thereby the belt reacher device may be moved around to the retracted position in a backward direction of the vehicle, after a predetermined length of time elapses since a time when the seating detection unit detected no occupant seated in the passenger seat and the start-up state-detection unit detected start-up of the vehicle.

According to the above-described aspect (1), when start-up of the vehicle is detected by turning on of the ignition switch or the like, the belt reacher device is moved around to the retracted position in a backward direction of the vehicle. Therefore, it is possible to reduce a processing load compared with, for example, a case where a vehicle speed or the like is continuously monitored, and it is possible to downsize the apparatus and to reduce the expense incurred in configuring the apparatus.

Moreover, because the belt reacher device has already been positioned at the retracted position at the time of running of the vehicle, it is possible to prevent the belt reacher device, the tongue of the webbing, and the like from hitting the door, and the like, and thereby it is possible to prevent giving an uncomfortable feeling to an occupant.

According to the above-described aspect (2), it is possible to detect with accuracy whether or not an occupant is seated, without a requirement to be provided with a special sensor.

According to the above-described aspect (3), responding to a case where wearing of a seat belt by an occupant is delayed, or the like, the reacher device is maintained so as to be moved around in a forward direction of the vehicle before a predetermined length of time elapses since start-up of the vehicle was detected, and thereby it is possible to improve convenience.

BRIEF DESCRIPTION OF THE DRAWINGS

FIG. 4A is a view that shows an attaching position of the belt reacher device of the seat belt apparatus according to the embodiment of the present invention.

FIG. 4B is a view that shows a retracted position of the belt reacher device of the seat belt apparatus according to the embodiment of the present invention.

FIG. 5 is a structural view of a power transmission mechanism of the seat belt apparatus according to the embodiment of the present invention.

DESCRIPTION OF THE EMBODIMENTS

Hereinafter, a seat belt apparatus according to an embodiment of the present invention will be described with reference made to the appended drawings.

Figure 1:
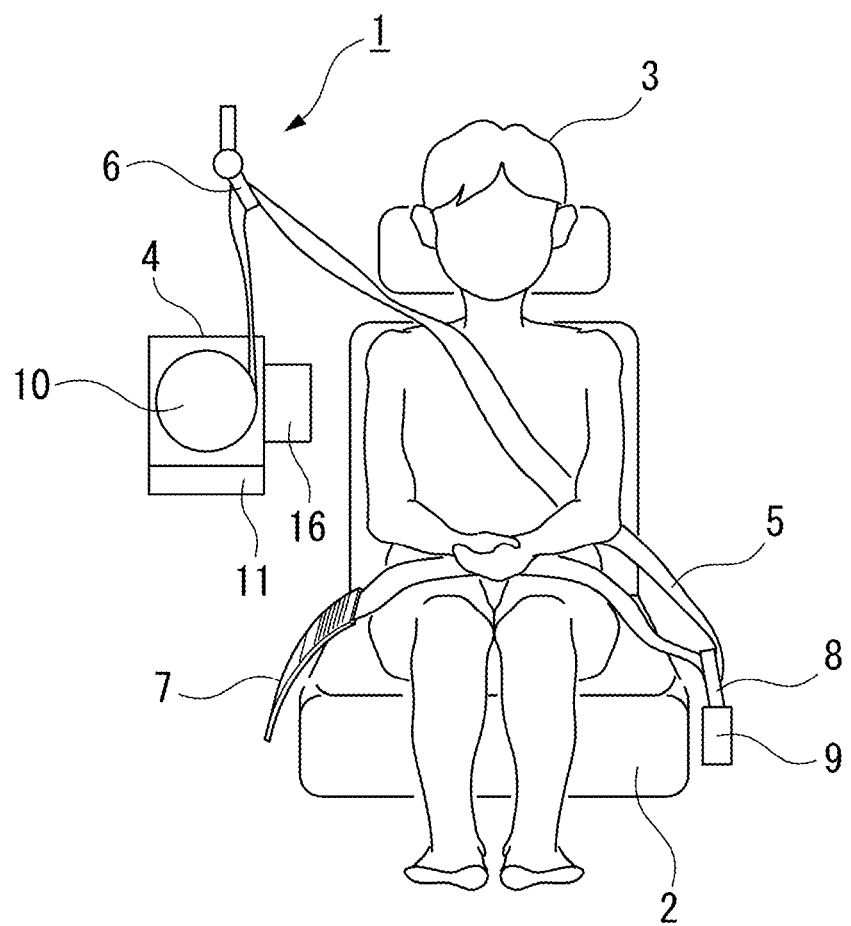
FIG. 1 is a structural view of a seat belt apparatus according to an embodiment of the present invention.

A seat belt apparatus 1 according to the present embodiment is, for example, as is shown in FIG. 1, a so-called three-point seat belt apparatus that is capable of holding an occupant 3 who is seated in a seat 2 of a vehicle.

A webbing 5 that is drawn out upward in a substantially vertical direction from a retractor 4 attached to a center pillar (not shown in the figure) is inserted into a through anchor 6 that is supported on an upper portion side of the center pillar, and a distal end of the webbing 5 is fixed to a vehicle floor via a belt reacher device 7 (seat belt reacher mechanism) on an outer side of a vehicle compartment with respect to the seat 2.

A tongue plate 8 (tongue) that is inserted into the webbing 5 between the through anchor 6 and the belt reacher device 7 is detachably attached to a buckle 9 which is fixed to the vehicle floor on an inner side of the vehicle compartment with respect to the seat 2.

The webbing 5 is winded up by the retractor 4 in an initial state (for example, in an unattached state). The webbing 5 is drawn out from a webbing reel 10 by the occupant 3 and the tongue plate 8 is attached and fixed to the buckle 9, whereby the body of the occupant 3 (for example, a chest portion, an abdomen portion, and the like) is held to the seat 2.

The seat belt apparatus 1 performs winding of the webbing 5 by a driving force of a motor 11 that gives a rotative force to the webbing reel 10, or the like, in case of, for example, emergencies, when the action of the vehicle changes, when the webbing 5 is winded and stored in the retractor 4, or the like.

Figure 2:
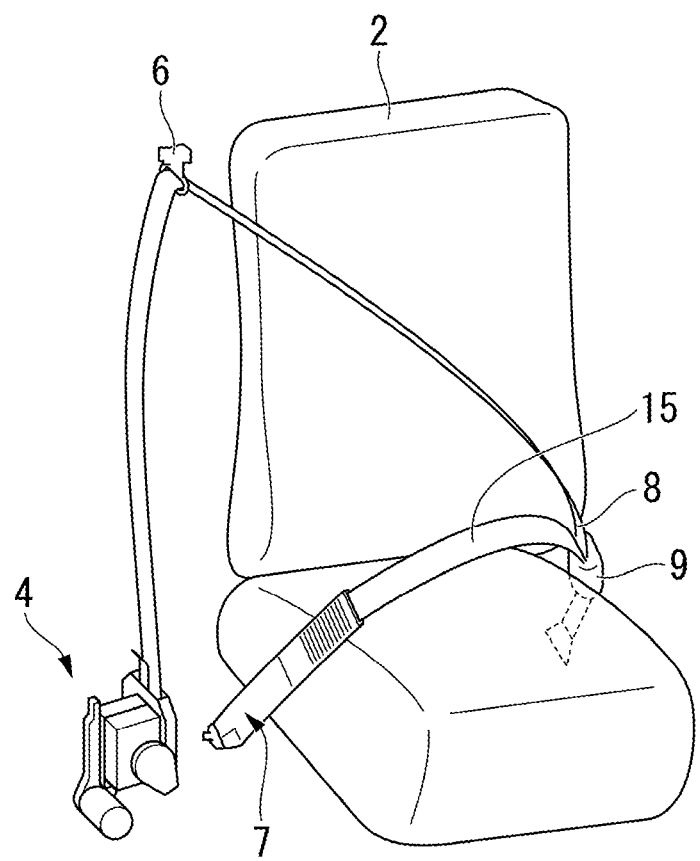
FIG. 2 is a perspective view of the seat belt apparatus according to the embodiment of the present invention.
Figure 3:
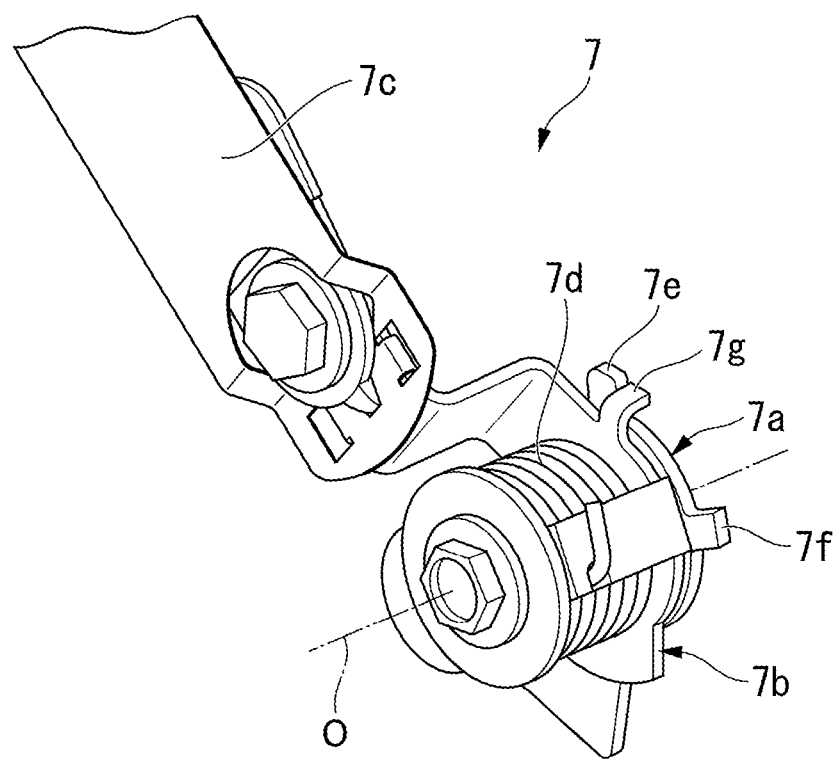
FIG. 3 is a perspective view that magnifies and shows a portion of a belt reacher device of the seat belt apparatus according to the embodiment of the present invention, looking at an outer side of a vehicle compartment from a seat side.

The belt reacher device 7 includes, for example, as is shown in FIG. 2 and FIG. 3, a support member 7*a* that is fixed to the vehicle floor, a rotative member 7*b* that is supported so as to be movable around an axis O of the support member 7*a*, an arm member 7*c* of which base end portion is fixed to the rotative member 7*b* and also of which distal end portion is connected to the distal end of the webbing 5, and a return spring 7*d* (biasing member).

The return spring 7*d* biases the belt reacher device 7 in a rotative direction from a backward direction of the vehicle to a forward direction of the vehicle. One end portion of the return spring 7*d* is hooked on the support member 7*a*. Another end portion of the return spring 7*d* is hooked on the rotative member 7*b*.

The support member 7*a* is provided with, for example, a forward restriction member 7*e* and a backward restriction member 7*f* that restrict rotation of the rotative member 7*b* (namely, moving around of the belt reacher device 7 in a forward and backward direction of the vehicle) within a predetermined range.

The rotative member 7*b* is provided with, for example, a restriction member 7*g* that restricts rotation of the rotative member 7*b* in a forward direction of the vehicle and rotation of the rotative member 7*b* in a backward direction of the vehicle by contacting the forward restriction member 7*e* and the backward restriction member 7*f* of the support member 7*a*.

For example, as is shown in FIG. 4A, in a state where a tensile force equal to or greater than a predetermined value does not act on in a winding direction of the webbing 5 by the motor 11 described later, or the like, the rotative member 7*b* moves around (rotates) in a forward direction of the vehicle from a backward direction of the vehicle by the return spring 7*d*. Then, the rotation of the rotative member 7*b* in a forward direction of the vehicle is restricted in a state where the restriction member 7*g* of the rotative member 7*b* is in contact with the forward restriction member 7*e* of the support member 7*a*, and the belt reacher device 7 is positioned at an attaching position in a forward direction of the vehicle. At this attaching position of the belt reacher device 7, for example, the arm member 7*c* is tilted toward a forward direction of a seat back of the seat 2.

In addition, for example, as is shown in FIG. 4B, in a state where a tensile force equal to or greater than a predetermined value acts on in a winding direction of the webbing 5 by the motor 11 described later, or the like, the rotative member 7*b* moves around (rotates) in a backward direction of the vehicle from a forward direction of the vehicle by the tensile force of the webbing 5. Then, the rotation of the rotative member 7*b* in a backward direction of the vehicle is restricted in a state where the restriction member 7*g* of the rotative member 7*b* is in contact with the backward restriction member 7*f* of the support member 7*a*, and the belt reacher device 7 is positioned at a retracted position in a backward direction of the vehicle. At this retracted position of the belt reacher device 7, for example, the arm member 7*c* is arranged along a lateral side of the seat back of the seat 2.

Figure 6:
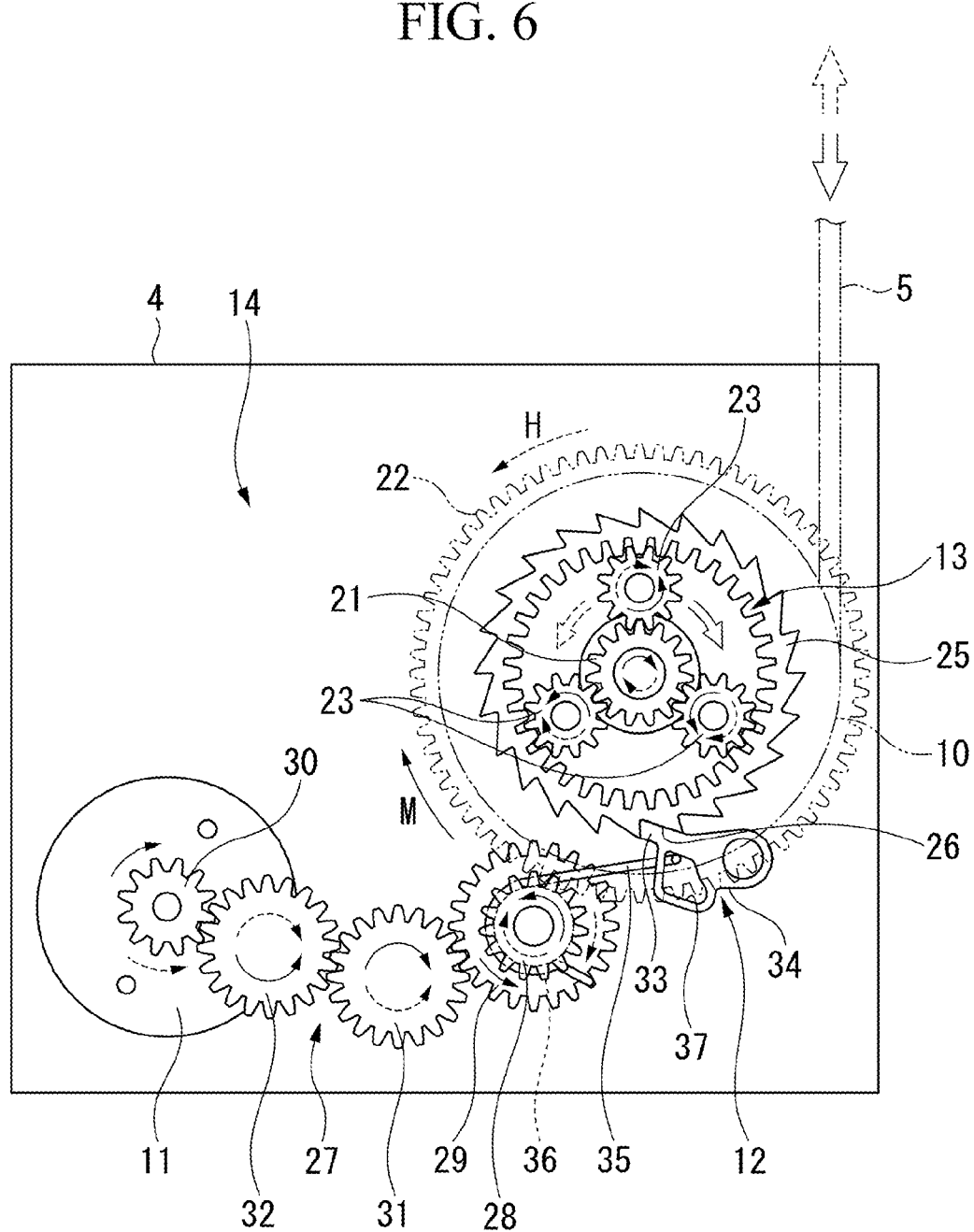
FIG. 6 is a structural view of the power transmission mechanism of the seat belt apparatus according to the embodiment of the present invention.

In the retractor 4, for example, as is shown in FIG. 5 and FIG. 6, the webbing reel 10 that is winded by the webbing 5 is rotatably supported by a retractor frame (not shown in the figure). A shaft 10*a* of the webbing reel 10 protrudes toward an outside from one end side of the retractor frame.

The shaft 10*a* of the webbing reel 10 is connected to and is movable in conjunction with a rotation shaft 11*a* of the motor 11 via a power transmission mechanism 14 that is provided with a clutch 12 (clutch member) for connection and disconnection of power and a gear mechanism 13.

The clutch 12 in the power transmission mechanism 14 is capable of disconnecting a connection between the motor 11 and the webbing reel 10, depending on a rotating state of the motor 11.

The retractor 4 is provided with a wind spring 15 that biases the webbing reel 10 in a winding direction of the webbing 5. In a state where the webbing reel 10 and the motor 11 are separated by the clutch 12, a tensile force by the wind spring 15 acts on the webbing 5.

The clutch 12 makes the power transmission mechanism 14 to be in a connecting state, initiated by an input of a rotation torque in a normal rotation direction of the motor 11 (winding direction of the webbing 5). The clutch 12 makes the power transmission mechanism 14 to be in a disconnecting state, initiated by an input of a rotation torque in a reverse rotation direction of the motor 11 (drawing-out direction of the webbing 5).

The retractor 4 is provided with an emergency lock mechanism 16 that mechanically locks unwinding of the webbing 5, for example, in the case that deceleration greater than a predetermined value acts on the vehicle, or the like.

Figure 7:
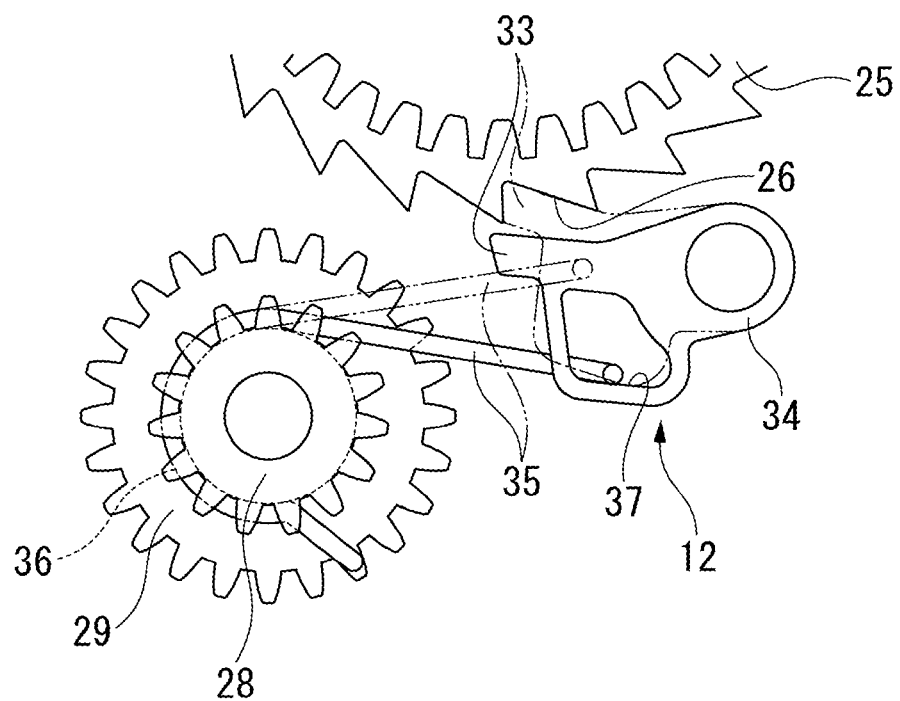
FIG. 7 is a structural view that magnifies and shows a portion of the power transmission mechanism of the seat belt apparatus according to the embodiment of the present invention.

In the gear mechanism 13 of the power transmission mechanism 14, for example, as is shown in FIG. 5 to FIG. 7, a sun gear 21 is integrally joined to an external tooth 22 for inputting of a driving force, and also a carrier 24 that supports a plurality of planetary gears 23 is joined to the shaft 10a of the webbing reel 10.

A portion of the clutch 12 is configured by a plurality of ratchet teeth 26 formed at an outer circumferential side of a ring gear 25 that is engaged to the planetary gear 23.

The clutch 12 appropriately disconnects a power transmission system between the motor 11 and the webbing reel 10 by the control of a driving force of the motor 11 by a control device 43 (control unit) described later.

A motor-side power transmission system 27 of the power transmission mechanism 14 is configured by a first connect gear 28 with a small diameter that is constantly engaged to the external tooth 22 integrated with the sun gear 21, a second connect gear 29 with a large diameter that is arranged to be rotatable concentrically and integrally with the first connect gear 28, and a first idler gear 31 and a second idler gear 32 that are provided between and constantly engaged so as to be capable of transmitting power to the second connect gear 29 and a motor gear 30 (integrated with the rotation shaft 11a of the motor 11).

The driving force of the motor 11 in a normal rotation direction, for example, as is indicated by a solid arrow M in FIG. 6, is transmitted to the second connect gear 29 and the first connect gear 28 via the motor gear 30, the second idler gear 32, and the first idler gear 31, further transmitted to the sun gear 21 via the external tooth 22, and then transmitted to the webbing reel 10 via the planetary gear 23 and the carrier 24.

This driving force of the motor 11 in a normal rotation direction rotates the webbing reel 10 in a drawing-in direction of the webbing 5. Note that, the driving force transmitted from the sun gear 21 to the planetary gear 23 is all transmitted to a carrier 24 side as described above when the ring gear 25 is fixed. However, in a state where the ring gear 25 is freely rotatable, the ring gear 25 is idled by the rotation of the planetary gear 23.

The clutch 12 turns on and off the transmission of the driving force of the motor to the webbing reel 10 (namely, carrier 24), by controlling lock of the rotation of the ring gear 25 and release of the lock.

The clutch 12 is supported so as to be movable around (rotatable), by a casing that is not shown in the figure, and provided with a pawl 34 having a latch claw 33 at a distal end portion, a clutch spring 35 that operates the pawl 34, and the ratchet tooth 26 of the ring gear 25 that is capable of engaging the latch claw 33 of the pawl 34.

The latch claw 33 comes into contact with a surface that is substantially perpendicular to an inclined plane of the ratchet tooth 26 when the pawl 34 is operated in a direction toward the ratchet tooth 26, and locks the rotation of the ring gear 25 in one direction.

The clutch spring 35 curves in an arc-like fashion at a base end portion side, and is latched in a state where this curved portion 36 winds around an outer circumference of a shaft portion of the first connect gear 28. The distal end portion of the clutch spring 35 extends in a direction toward the pawl 34, and engages an operation window 37 of the pawl 34.

Note that, the curved portion 36 of the clutch spring 35 frictionally engages the shaft portion of the first connect gear 28. When a torque equal to or more than a set value acts between the curved portion 36 of the clutch spring 35 and the first connect gear 28, sliding between the curved portion 36 of the clutch spring 35 and the first connect gear 28 occurs by the torque.

In the clutch 12, when the motor 11 rotates in a normal rotation direction (for example, a direction of the solid arrow M in FIG. 6), the clutch spring 35 changes, for example, from an attitude indicated by a solid line in FIG. 7 to an attitude indicated by a dashed line. Thereby, the latch claw 33 of the pawl 34, as is shown in FIG. 6, engages the ratchet tooth 26 and locks the rotation of the ring gear 25.

Note that, the ratchet tooth 26 can reliably lock the rotation of the ring gear 25 in one direction. In addition, when the ring gear 25 seeks to rotate in a reverse direction, equal to or more than a certain intensity of force is also required such that the ratchet tooth 26 pushes up the latch claw 33.

When the rotation of the ring gear 25 is locked, as described above, the rotative force transmitted to the sun gear 21 completely produces the rotation of the carrier 24 so as to be transmitted to the webbing reel 10. This state is a clutch-on state.

On the other hand, when the motor 11 reversely rotates from this clutch-on state, the first connect gear 28 rotates, for example, as is indicated by a dotted arrow H in FIG. 6 so as to move the clutch spring 35 around, for example, as is indicated by the solid line in FIG. 7. Thereby, the latch claw 33 of the pawl 34 is separated from the ratchet tooth 26, and the lock of the ring gear 25 is released.

When the lock of the ring gear 25 is released, as described above, the rotative force transmitted to the sun gear 21 rotates the planetary gear 23 and idles the ring gear 25 at this time, thus the power is not transmitted to a carrier 24 (webbing reel 10) side. This state is a clutch-off state.

In the clutch 12, at the time of the above-described clutch-on state (connecting state), the behavior of the ring gear 25 is different depending on the relative rotation condition between the sun gear 21 that is positioned at a motor 11 side with respect to the planetary gear 23 in a power transmission route and the carrier 24 that is positioned at a webbing reel 10 side with respect to the planetary gear 23.

In other words, when a rotation speed of the sun gear 21 (motor 11 side) in a normal rotation direction is equal to or greater than a rotation speed of the carrier 24 (webbing reel 10 side), the rotation torque of the sun gear 21 acts on in a direction in which the ring gear 25 is locked by the latch claw 33 of the pawl 34. At this time, the ring gear 25 receives a force that causes the ring gear 25 to rotate reversely with respect to the rotation direction of the carrier 24, and the latch claw 33 engages the ratchet tooth 26, whereby producing a state where the rotation of the ring gear 25 is stopped.

On the other hand, when a rotation speed of the carrier 24 (webbing reel 10 side) in a normal rotation direction is greater than a rotation speed of the sun gear 21 (motor 11 side), the rotation torque of the carrier 24 acts on in a direction in which the ring gear 25 is made to be slid with respect to the latch claw 33 of the pawl 34. Note that, at this time, the latch claw 33 of the pawl 34 slides on the inclined plane of the ratchet tooth 26 of the ring gear 25 and intermittently contacts a tooth groove.

In this embodiment, the pawl 34 and the ring gear 25 configure a structural component that allows free rotation in a side of the webbing reel 10 by sliding mutually, when the clutch 12 is in a connecting state.

The seat belt apparatus 1 is provided with, as is shown in FIG. 5, a motor driving unit 41, an electric source 42, a control device 43, a buckle switch 51 (seating detection unit), a rotation angle sensor 52, a current sensor 53, a voltage sensor 54, a door switch 55 (door opening/closing detection unit), and an ignition switch 56 (start-up state-detection unit).

The buckle switch 51 outputs an ON signal when the tongue plate 8 is attached to and fixed to the buckle 9, and outputs an OFF signal when the tongue plate 8 is detached from the buckle 9.

The rotation angle sensor 52 outputs a detection signal of a rotational position (namely, a rotation angle) of the webbing reel 10.

The current sensor 53 outputs a detection signal of a current that is injected to the motor 11.

The voltage sensor 54 outputs a detection signal of a source voltage that is output from the electric source 42.

The door switch 55 outputs a signal corresponding to an open state and a closed state of a door (not shown in the figure) of the vehicle.

The motor driving unit 41 is provided with switching devices that are bridge connected, or the like, and controls an injection amount and an injection direction of a current that is injected to the motor 11 from the electric source 42, corresponding to a control signal that is output from the control device 43.

The control device 43 that is configured by an electronic circuit such as a CPU (Central Processing Unit) outputs a control signal for controlling a current that is injected to the motor 11.

In the case, for example, that a change from an open state to a closed state of the door of the vehicle is detected by the door switch 55, the control device 43 makes the clutch 12 to be in a disconnecting state by the driving of the motor 11, and thereby causes the belt reacher device 7 to be moved around by the return spring 7d to the attaching position in a forward direction of the vehicle.

In addition, for example, the control device 43 determines that an occupant seated in the passenger seat is not detected by an output of an OFF signal from the buckle switch 51 in the passenger seat. In this state, by an output of an ON signal from the ignition switch 56, a determination is made that start-up of the vehicle is detected. At this time, after a predetermined length of time elapses, the belt reacher device 7 is moved around to the retracted position in a backward direction of the vehicle, by winding the webbing 5 by the driving of the motor 11.

The seat belt apparatus 1 according to the present embodiment includes the above-described configuration, and next, an operation of this seat belt apparatus 1 will be explained.

Figure 8:
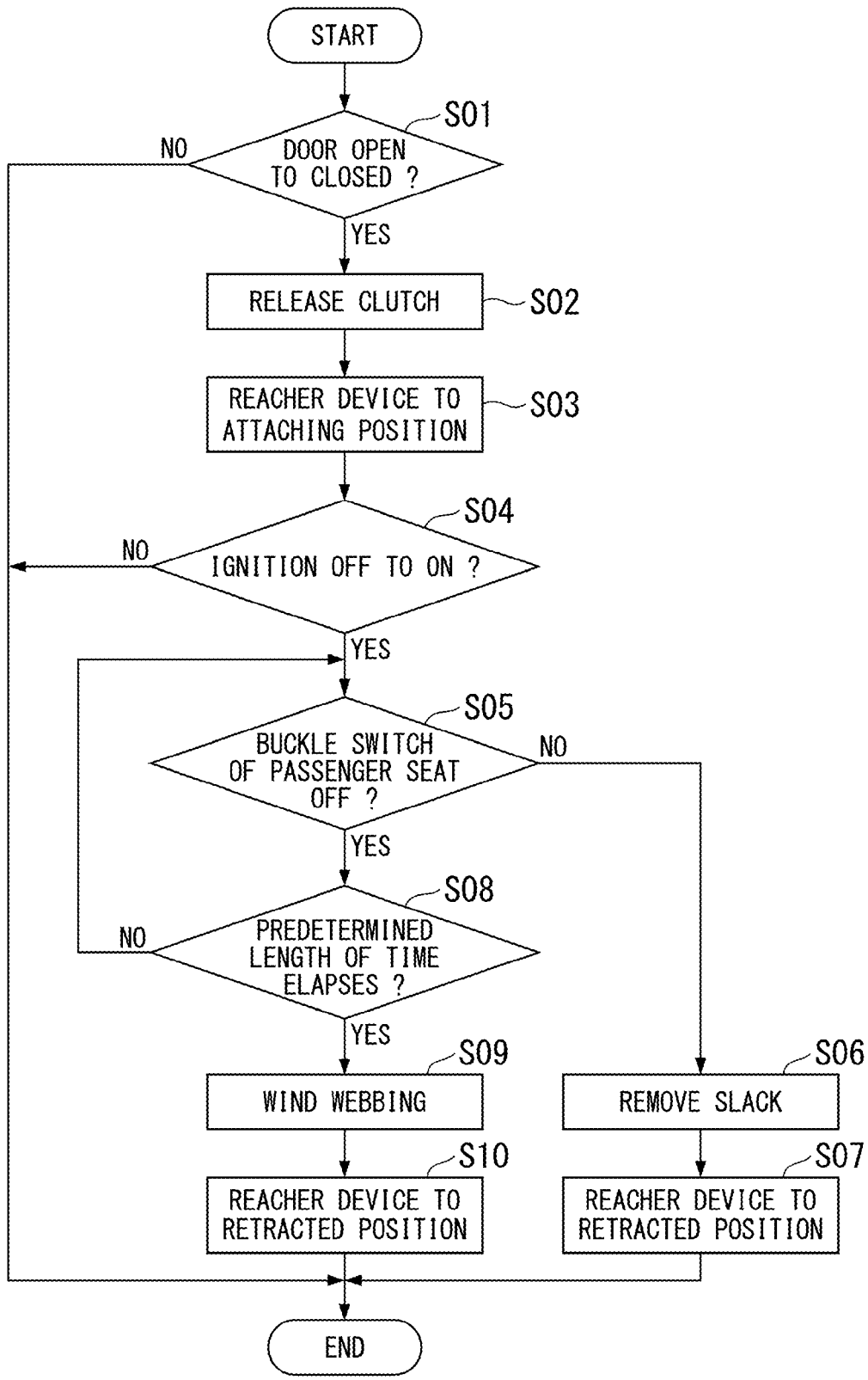
FIG. 8 is a flowchart that shows an operation of the seat belt apparatus according to the embodiment of the present invention.

First, for example, in step S01 shown in FIG. 8, a determination is made as to whether or not a change from an open state to a closed state of the door of the vehicle is detected by the door switch 55.

If this determination result is "NO", then the routine proceeds to END.

On the other hand, if this determination result is "YES", then the routine proceeds to step S02.

Next, in step S02, the motor 11 is reversely rotated and thereby a connecting state of the power transmission mechanism 14 by the clutch 12 is switched to a disconnecting state, then the driving of the motor 11 is stopped.

Next, in step S03, the belt reacher device 7 is moved around by the return spring 7d to the attaching position in a forward direction of the vehicle.

Next, in step S04, a determination is made as to whether or not a signal that is output from the ignition switch 56 is switched to an ON signal from an OFF signal.

If this determination result is "NO", then the routine proceeds to END.

On the other hand, if this determination result is "YES", then the routine proceeds to step S05.

Next, in step S05, a determination is made as to whether or not an OFF signal is output from the buckle switch 51 in the passenger seat.

If this determination result is "YES", then the routine proceeds to step S08 described later.

On the other hand, if this determination result is "NO", then a determination is made that an occupant is seated in the passenger seat, and the routine proceeds to step S06.

Then, in step S06, slack of the webbing 5 is removed by the motor 11.

Then, in step S07, a tensile force for removing the slack acts on the webbing 5 by the driving of the motor 11, and thereby the belt reacher device 7 moves around to the retracted position in a backward direction of the vehicle. Then, the routine proceeds to END.

On the other hand, in step S08, a determination is made as to whether or not a predetermined length of time elapses after the belt reacher device 7 is moved around to the attaching position in a forward direction of the vehicle.

If this determination result is "NO", then the routine returns to step S05 described above.

On the other hand, if this determination result is "YES", then the routine proceeds to step S09.

Then, in step S09, the webbing 5 is winded by the driving of the motor 11.

Then, in step S10, a tensile force for winding acts on the webbing 5 by the driving of the motor 11, and thereby the belt reacher device 7 moves around to the retracted position in a backward direction of the vehicle. Then, the routine proceeds to END.

As is described above, in the seat belt apparatus 1 according to the present embodiment, when start-up of a vehicle is detected by turning on of the ignition switch 56, or the like, the belt reacher device 7 is moved around to the retracted position in a backward direction of the vehicle. Therefore, it is possible to reduce a processing load of the control device 43 compared with, for example, a case where a vehicle speed, or the like is continuously monitored, and it is possible to downsize the apparatus and to reduce the expense incurred in configuring the apparatus.

Moreover, because the belt reacher device 7 has already been positioned at the retracted position at the time of running of the vehicle, slack of the webbing 5 is resolved, and it is possible to prevent the belt reacher device 7, the tongue plate 8 of the webbing 5, and the like from hitting the door, and the like. Accordingly, it is possible to prevent giving an uncomfortable feeling to an occupant.

In addition, by using a signal that is output from the buckle switch 51, it is possible to accurately detect whether or not an occupant is seated in the seat 2, without a requirement to be provided with a special sensor, or the like.

Moreover, responding to a case where wearing of the webbing 5 by an occupant is delayed, or the like, the belt reacher device 7 is maintained so as to be moved around to the attaching position in a forward direction of the vehicle before a predetermined length of time elapses since start-up of the vehicle was detected. Accordingly, it is possible to improve convenience.

Note that, in the above-described embodiment, whether or not an occupant is seated in the seat 2 is detected, based on a signal that is output from the buckle switch 51, however, the invention is not limited thereto. A signal that is output from other sensors such as, for example, a weight sensor which detects load acting on the seat 2 and a camera which images an occupant seated in the seat 2, or the like, may be used.

Note that, the technical scope of the present invention is not limited to the above-described embodiments and a variety of modifications can be made to the above-described embodiments without departing from the scope of the present invention. Accordingly, it should be understood that the structures in the embodiments described and illustrated above are exemplary of the invention and can be suitably altered.

What is claimed is:

1. A seat belt apparatus comprising:
a webbing reel that winds a webbing to hold an occupant of a vehicle;
a motor that is connected to the webbing reel via a transmission mechanism;
a clutch member that is movable to a connecting position at which the motor and the webbing reel are maintained in a connecting state, and that is movable to a disconnecting position at which the motor and the webbing reel are maintained in a disconnecting state;
a belt reacher device that is arranged to be movable in a forward and a backward direction of the vehicle around an axis in an outward direction with respect to a vehicle compartment from a passenger seat, moves around in the forward direction of the vehicle by a biasing member, and moves around to a retracted position in the backward direction of the vehicle by winding of the webbing;
a seating detection unit that detects whether or not the occupant is seated in the passenger seat;
a start-up state-detection unit that detects a start-up state of the vehicle;
a door opening/closing-detection unit that detects opening and closing of a door of the vehicle; and
a control unit that controls the motor,
wherein, in response to the door opening/closing-detection unit detecting a change from an open state to a closed state of the door, the control unit controls driving of the motor such that the clutch member is moved to the disconnecting position and thereby the belt reacher device is moved around in the forward direction of the vehicle by the biasing member, and
wherein, in response to the seating detection unit detecting no occupant seated in the passenger seat and the start-up state-detection unit detecting the start-up of the vehicle, the control unit controls the driving of the motor such that the webbing is wound and thereby the belt reacher device is moved around to the retracted position in the backward direction of the vehicle.

2. The seat belt apparatus according to claim 1, wherein the seating detection unit is a buckle switch that detects whether or not a tongue of the webbing is attached to a buckle of the passenger seat.

3. A seat belt apparatus comprising:
a webbing reel that winds a webbing to hold an occupant of a vehicle;
a motor that is connected to the webbing reel via a transmission mechanism;
a clutch member that is movable to a connecting position at which the motor and the webbing reel are maintained in a connecting state, and that is movable to a disconnecting position at which the motor and the webbing reel are maintained in a disconnecting state;
a belt reacher device that is arranged to be movable in a forward and a backward direction of the vehicle around an axis in an outward direction with respect to a vehicle compartment from a passenger seat, moves around in the forward direction of the vehicle by a biasing member, and moves around to a retracted position in the backward direction of the vehicle by winding of the webbing;
a seating detection unit that detects whether or not the occupant is seated in the passenger seat;
a start-up state-detection unit that detects a start-up state of the vehicle;
a door opening/closing-detection unit that detects opening and closing of a door of the vehicle; and
a control unit that controls the motor,
wherein, in response to the seating detection unit detecting no occupant seated in the passenger seat, the start-up state-detection unit detecting the start-up of the vehicle, and a predetermined length of time elapsing following the detection of both no occupant seated in the passenger seat by the seating detection unit and the start-up of the vehicle by the start-up state-detection unit, the control unit controls driving of the motor such that the webbing is wound and thereby the belt reacher device is moved around to the retracted position in the backward direction of the vehicle.

4. The seat belt apparatus according to claim 3, wherein, in response to the door opening/closing-detection unit detecting a change from an open state to a closed state of the door, the control unit controls driving of the motor such that the clutch member is moved to the disconnecting position and thereby the belt reacher device is moved around in the forward direction of the vehicle by the biasing member.

5. The seat belt apparatus according to claim 4, wherein the seating detection unit is a buckle switch that detects whether or not a tongue of the webbing is attached to a buckle of the passenger seat.

* * * * *